United States Patent
Chen et al.

(10) Patent No.: US 7,606,053 B2
(45) Date of Patent: Oct. 20, 2009

(54) DC-TO-DC CONVERTER AND ELECTRIC MOTOR DRIVE SYSTEM USING THE SAME

(75) Inventors: Chingchi Chen, Ann Arbor, MI (US); Michael Degner, Novi, MI (US); Venkateswa Sankaran, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 11/278,867

(22) Filed: Apr. 6, 2006

(65) Prior Publication Data

US 2007/0236965 A1   Oct. 11, 2007

(51) Int. Cl.
H02M 7/5378 (2006.01)
G05F 1/00 (2006.01)

(52) U.S. Cl. .......... 363/132; 363/17; 323/282; 323/352

(58) Field of Classification Search ............ 363/132, 363/17; 323/225, 259, 282, 284, 344, 351; 180/65.1, 65.31
See application file for complete search history.

(56) References Cited

U.S. PATENT DOCUMENTS

| | | | |
|---|---|---|---|
| 4,200,791 A * | 4/1980 | Burough | 250/343 |
| 5,245,520 A * | 9/1993 | Imbertson | 363/17 |
| 5,539,610 A | 7/1996 | Williams et al. | |
| 5,633,791 A * | 5/1997 | Poon et al. | 363/56.02 |
| 5,657,212 A * | 8/1997 | Poon et al. | 363/17 |
| 5,703,447 A * | 12/1997 | Higuchi | 318/139 |
| 5,737,203 A * | 4/1998 | Barrett | 363/75 |
| 5,835,371 A * | 11/1998 | Kume et al. | 363/132 |
| 5,995,398 A | 11/1999 | Yamauchi et al. | |
| 6,026,006 A * | 2/2000 | Jiang et al. | 363/132 |
| 6,144,192 A * | 11/2000 | Suzuki | 323/222 |

(Continued)

FOREIGN PATENT DOCUMENTS

EP   0259845 B1   3/1988

(Continued)

OTHER PUBLICATIONS

Leon M. Tolbert, William A. Peterson, Cliff P. White, Timothy J. Thiess, Matthew B. Scudiere, A Bi-Directional DC-DC Converter with Minimum Energy Storage Elements, IEEE, 2002.

(Continued)

*Primary Examiner*—Jessica Han
*Assistant Examiner*—Emily Pham
(74) *Attorney, Agent, or Firm*—David B. Kelley; Brooks Kushman P.C.

(57) ABSTRACT

A DC-to-DC converter is provided and generally configured for implementation with an electric motor drive system. In at least one embodiment, the DC-to-DC converter includes first and second capacitors, an inductor, and first and second switching devices. The DC-to-DC converter is bi-directional to facilitate voltage transfer therethrough. In at least another embodiment, the electric motor drive system comprises an energy storage device, a drive unit, an electric motor and a bi-directional DC-to-DC converter. The energy storage device includes a positive and a negative terminal. The drive unit includes a first and second terminal. The electric motor is in electrical communication with the drive unit.

21 Claims, 3 Drawing Sheets

U.S. PATENT DOCUMENTS

| | | | |
|---|---|---|---|
| 6,252,751 B1 * | 6/2001 | Rozman | 361/23 |
| 6,268,666 B1 * | 7/2001 | Bhowmik | 307/72 |
| 6,310,785 B1 * | 10/2001 | Ayyanar et al. | 363/17 |
| 6,321,145 B1 * | 11/2001 | Rajashekara | 701/22 |
| 6,630,797 B2 * | 10/2003 | Qian et al. | 315/224 |
| 6,828,762 B2 * | 12/2004 | Brkovic | 323/222 |
| 6,853,537 B2 * | 2/2005 | Ishii | 361/512 |
| 6,982,499 B1 | 1/2006 | Kachi et al. | |
| 6,984,964 B2 * | 1/2006 | Chang | 323/207 |
| 7,036,469 B2 * | 5/2006 | Degner et al. | 123/90.11 |
| 7,084,588 B2 * | 8/2006 | Hampo et al. | 318/139 |
| 7,193,396 B2 * | 3/2007 | Orr | 323/225 |
| 2002/0047693 A1 | 4/2002 | Chang | |
| 2003/0081440 A1 | 5/2003 | Komatsu et al. | |
| 2003/0117019 A1 * | 6/2003 | Furukawa et al. | 307/10.6 |
| 2003/0117823 A1 | 6/2003 | Sato | |
| 2006/0048983 A1 * | 3/2006 | Urakabe et al. | 180/65.3 |
| 2006/0097671 A1 * | 5/2006 | Yoshida | 318/109 |

FOREIGN PATENT DOCUMENTS

| | | |
|---|---|---|
| EP | 0585077 B1 | 5/1996 |
| EP | 1630937 A1 | 3/2006 |
| WO | 2004055963 A1 | 7/2004 |

OTHER PUBLICATIONS

German Search Report, dated Jul. 29, 2008, 4 pages.
Search Report under Section 17, dated Jul. 11, 2007, 1 page.

* cited by examiner

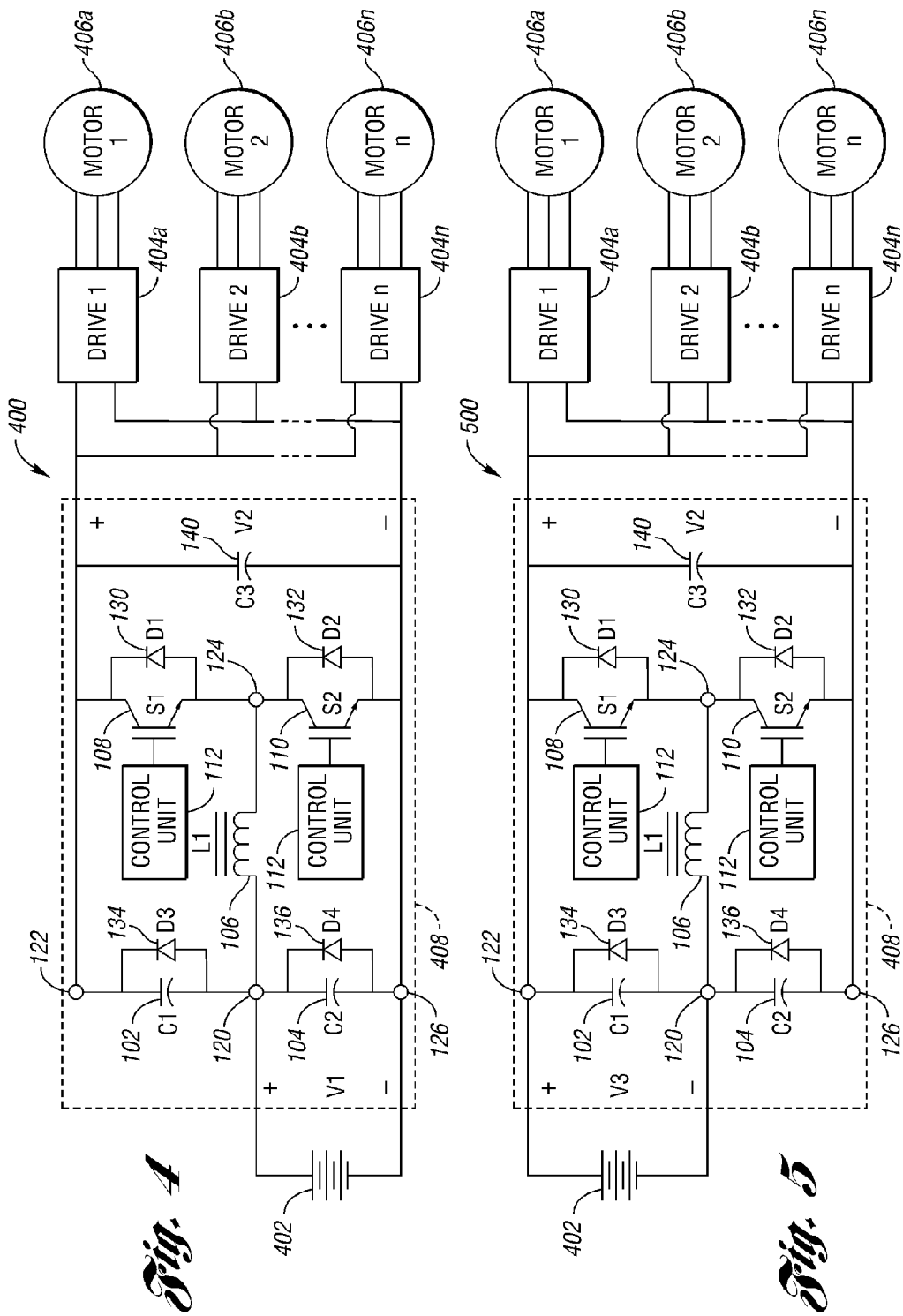

DC-TO-DC CONVERTER AND ELECTRIC MOTOR DRIVE SYSTEM USING THE SAME

BACKGROUND OF THE INVENTION

1. Field of the Invention

The present invention relates generally to a DC-to-DC converter and to an electric motor drive system using the same.

2. Background Art

A DC-to-DC converter generally transforms (i.e., converts) direct current ("DC") voltage from a first voltage level to a second voltage level. A DC-to-DC converter that transforms a lower input voltage into a higher output voltage (i.e., steps up the voltage) may be referred to as a "boost" converter. Similarly, a DC-to-DC converter that transforms a higher input voltage into a lower output voltage (i.e., steps down the voltage) may be referred to as a "buck" converter.

Referring to FIG. 1(a), a schematic diagram of a conventional bi-directional DC-to-DC converter 10 is shown. In general, Va, Vb and Vc represent three possible terminal voltages, with Vb being greater than or equal to Va (i.e., Vb≧Va), and Vc being equal to the difference between Vb and Va (i.e., Vc=Vb−Va). The conventional DC-to-DC converter 10 is bi-directional in the sense that any one of the voltages Va, Vb or Vc may be implemented as the input while one or both of the remaining voltages may be implemented as outputs. For example, when Va is implemented as the input and Vb is implemented as an output, the converter 10 is generally a boost converter. Similarly, when Vb is implemented as the input and Va is implemented as an output, the converter 10 is generally a buck converter. Likewise, when Va is implemented as the input and Vc is implemented as an output, the converter 10 is generally a boost-buck converter. Similarly, when Vc is implemented as the input and Va is implemented as an output, the converter 10 is generally a buck-boost converter. The capacitors Ca and Cb of the conventional converter 10 are filter capacitors and the inductor La is a DC choke.

Referring, now, to FIG. 1(b), a schematic diagram of another conventional bi-directional DC-to-DC converter 20 is shown. In general, the converter 20 may be implemented similarly to the converter 10 with the exception that a plurality of capacitors 22, such as Cb and Cc, may be implemented in series across voltage Vb. The use of the plurality of capacitors 22 generally provides a higher voltage rating for the terminal voltage Vb. Accordingly, the converter 20 of FIG. 1(b) may be implemented in systems with high DC voltages, or with capacitors at lower voltage ratings, in comparison with systems using the converter 10.

It is known, however, that parameter variations, such as unmatched capacitances, leakage resistance and the like, between the plurality of capacitors 22 may result in uneven voltage sharing between the capacitors 22. Uneven voltage sharing, in turn, may expose one or more of the capacitors 22 to an over-voltage condition. Conventional attempts to limit occurrences of over-voltage conditions generally require the use of closely matched capacitors or capacitors with higher voltage ratings. The use of such closely matched or higher voltage rated capacitors generally results in an increased cost of manufacturing the controller 20.

SUMMARY OF THE INVENTION

Accordingly, it may be desirable to have a DC-to-DC converter, configurable for use with high DC voltages, wherein the DC-to-DC converter may be implemented with capacitors having lower voltage ratings and/or may be less susceptible to parameter variation, as compared to conventional converters such as 10 and 20. Such a converter may decrease the cost of manufacturing by reducing the need for closely matched capacitors and/or the need for capacitors at higher voltage ratings.

In accordance with one embodiment of the present invention, a DC-to-DC converter is provided. The DC-to-DC converter includes first and second capacitors each having a first and second terminal, an inductor having a first and second terminal, and first and second switching devices each having a first and second terminal. The first terminal of the inductor is coupled to both the first terminal of the second capacitor and the second terminal of the first capacitor to form a first node. The first terminal of the first switching device is coupled to the first terminal of the first capacitor to form a second node. The first terminal of the second switching device is coupled to the second terminal of the first switching device and the second terminal of the inductor to form a third node. The second terminal of the second switching device is coupled to the second terminal of the second capacitor to form a fourth node. The first switching device is configured to electrically couple the first and second terminals of the first switching device in response to a first control signal. Similarly, the second switching device is configured to electrically couple the first and second terminals of the second switching device in response to a second control signal.

In accordance with another embodiment of the present invention, an electric motor drive system is provided. The system comprises an energy storage device having a positive and a negative terminal, a drive unit having a first and second terminal, an electric motor in electronic communication with the drive unit, and a DC-to-DC converter. The DC-to-DC converter includes first and second capacitors each having a first and second terminal, an inductor having a first and second terminal, and first and second switching devices each having a first and second terminal. The first terminal of the inductor is coupled to both the first terminal of the second capacitor and the second terminal of the first capacitor to form a first node. The first terminal of the first switching device is coupled to the first terminal of the first capacitor to form a second node. The first terminal of the second switching device is coupled to the second terminal of the first switching device and the second terminal of the inductor to form a third node. The second terminal of the second switching device is coupled to the second terminal of the second capacitor to form a fourth node. The positive terminal of the energy storage device is coupled to the first node and the negative terminal of the energy storage device is coupled to the fourth node. The first and second terminals of the drive unit are coupled to the second and fourth nodes, respectively. The first switching device is configured to electrically couple the first and second terminals of the first switching device in response to a first control signal. Similarly, the second switching device is configured to electrically couple the first and second terminals of the second switching device in response to a second control signal.

In accordance with yet another embodiment of the present invention, another electric motor drive system is provided. The system comprises an energy storage device having a positive and a negative terminal, a drive unit having a first and second terminal, an electric motor in electronic communication with the drive unit, and a DC-to-DC converter. The DC-to-DC converter includes first and second capacitors each having a first and second terminal, an inductor having a first and second terminal, and first and second switching devices each having a first and second terminal. The first terminal of the inductor is coupled to both the first terminal of the second capacitor and the second terminal of the first capacitor to form a first node. The first terminal of the first switching device is coupled to the first terminal of the first capacitor to form a second node. The first terminal of the second switching device is coupled to the second terminal of the first switching device and the second terminal of the inductor to form a third node. The second terminal of the second switching device is coupled to the second terminal of the second capacitor to form a fourth node. The positive terminal of the energy storage device is coupled to the second node and the negative terminal of the energy storage device is coupled to the first node. The first and second terminals of the drive unit are coupled to the second and fourth nodes, respectively. The first switching device is configured to electrically couple the first and second terminals of the first switching device in response to a first control signal. Similarly, the second switching device is configured to electrically couple the first and second terminals of the second switching device in response to a second control signal.

BRIEF DESCRIPTION OF THE DRAWINGS

FIG. 4 is a schematic diagram of an electric motor drive system according to at least one embodiment of the present invention; and FIG. 5 is a schematic diagram of an electric motor drive system according to at least one other embodiment of the present invention.

DETAILED DESCRIPTION

Figure 1A:
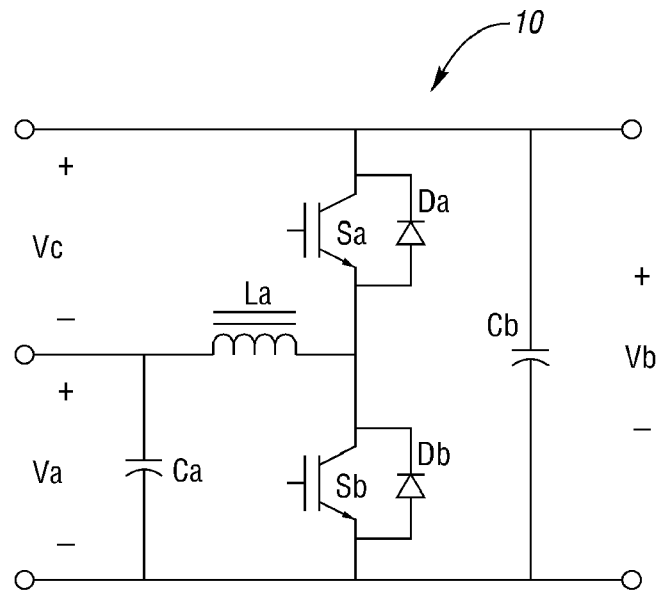
FIGS. 1(a-b) are schematic diagrams of conventional bi-directional DC-to-DC converters.
Figure 1B:
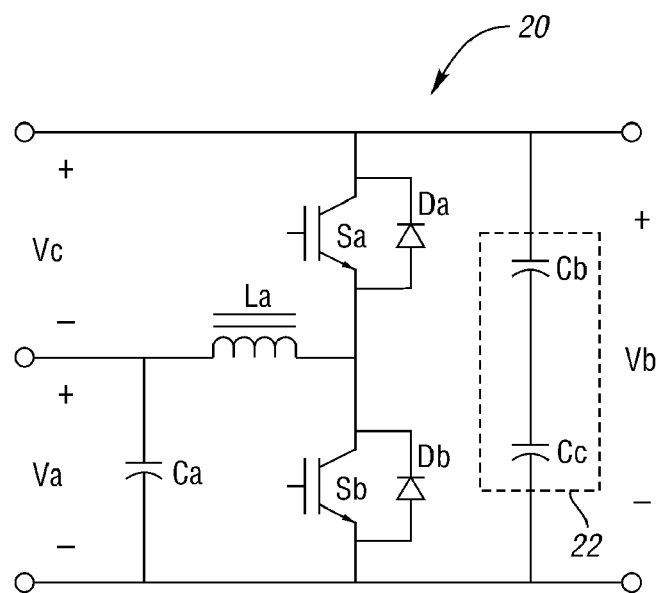
Figure 2:
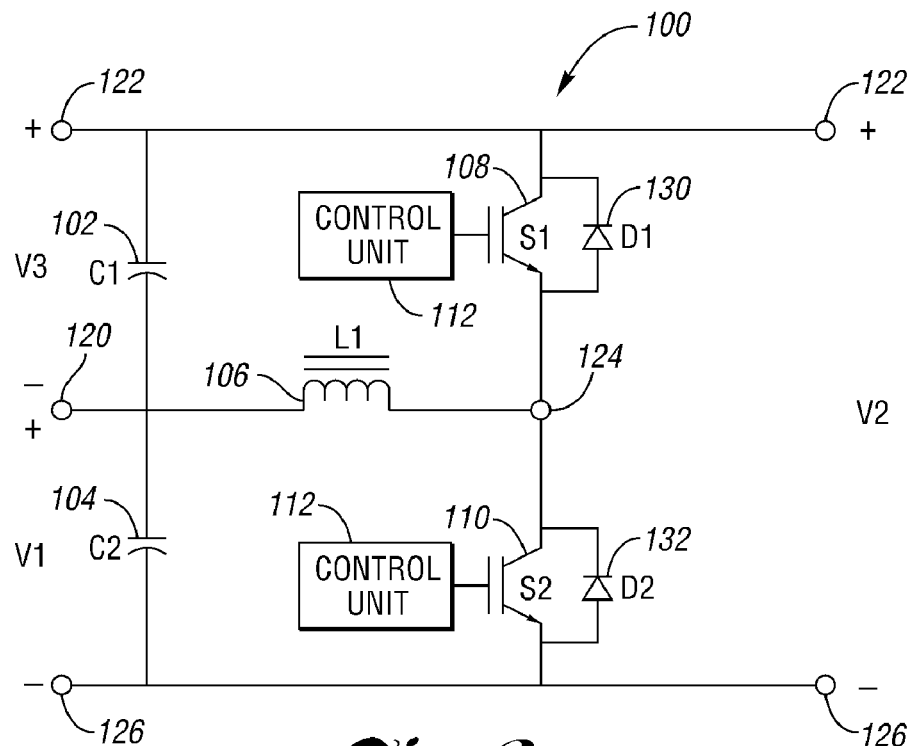
FIG. 2 is a schematic diagram of a DC-to-DC converter according to at least one embodiment of the present invention.

Referring to FIG. 2, a schematic diagram of a DC-to-DC converter 100 according to at least one embodiment of the present invention is shown. The converter 100 generally comprises a first capacitor (i.e., C1) 102, a second capacitor (i.e., C2) 104, an inductor (i.e., L1) 106, a first switching device (i.e., S1) 108, a second switching device (i.e., S2) 110, and a plurality of nodes, such as a first node 120, a second node 122, a third node 124, and a fourth node 126.

The first capacitor 102 (i.e., capacitive element), the second capacitor 104, and the inductor 106 (i.e., inductive element) may each include a first and second terminal (i.e., electrical connection point) for coupling (i.e., electrically coupling and/or directly coupling) the corresponding component (i.e., 102, 104, and/or 106) to adjacent components. Similarly, the first 108 and/or second 110 switching devices (i.e., switches) may each include a first and second terminal for coupling the corresponding switch (i.e., 108 and/or 110) to adjacent components.

In accordance with at least one embodiment of the present invention, the first terminal of the inductor 106 may be coupled to both the first terminal of the second capacitor 104 and the second terminal of the first capacitor 102 to form the first node 120. Similarly, the first terminal of the first switching device 108 may be coupled to the first terminal of the first capacitor 102 to form the second node 122, the first terminal of the second switching device 110 may be coupled to the second terminal of the first switching device 108 and the second terminal of the inductor 106 to form the third node 124, and the second terminal of the second switching device 110 may be coupled to the second terminal of the second capacitor 104 to form the fourth node 126.

In general, the DC-to-DC converter 100 may be bi-directional in the sense that any one of the voltages V1, V2 or V3 may be implemented as an input to the converter 100 while one or both of the remaining voltages may be implemented as outputs. In one exemplary embodiment, the converter 100 may be implemented as a boost (i.e., step up) converter when an input voltage, such as V1 or V3, is placed (i.e., applied) across nodes 120 and 126 or nodes 122 and 120, respectively, and an output voltage V2 is taken (i.e., outputted to a load) across nodes 122 and 126. In another exemplary embodiment, the converter 100 may be implemented as a buck (i.e., step down) converter when an input voltage V2 is placed across nodes 122 and 126 and an output voltage, such as V1 or V3, is taken across nodes 120 and 126 or nodes 122 and 120, respectively. In yet another exemplary embodiment, the converter 100 may be implemented as a boost-buck converter when an input voltage V1 is placed across nodes 120 and 126 and an output voltage V3 is taken across nodes 122 and 120. In still yet another exemplary embodiment, the converter 100 may be implemented as a buck-boost converter when an input voltage V3 is placed across nodes 122 and 120 and an output voltage V1 is taken across nodes 120 and 126. However, any appropriate voltage (e.g., V1, V2 or V3) may be implemented as an input to the converter 100 and any appropriate corresponding terminal voltage may be implemented as an output from the converter 100 to meet the design criteria of a particular application.

In at least one embodiment, the first 102 and second 104 capacitors may be polarized capacitors such that the first/second terminal of each of the first 102 and second 104 capacitors corresponds to a positive/negative lead, respectively. Such an embodiment may be particularly beneficial in a high voltage application, such as a pure electric vehicle, a hybrid electric vehicle and/or a fuel-cell electric vehicle.

In general, the first 108 and second 110 switching devices may be any appropriate device for electrically coupling the corresponding first and second terminals in response to a corresponding control signal. That is, the first switching device 108 may be any appropriate device for electrically coupling the first and second terminals of the first switching device 108 in response to a first control signal while the second switching device 110 may be any appropriate device for electrically coupling the first and second terminals of the second switching device 110 in response to a second control signal. In at least one embodiment, the first 108 and/or second 110 switching devices may include an electro-mechanical and/or solid state relay device. In at least one other embodiment, the first 108 and/or second 110 switching devices may include a transistor, such as a Metal-Oxide Semiconductor Field-Effect Transistor (i.e., MOSFET), an Insulated Gate Bipolar Transistor (i.e., IGBT), a Bipolar Junction Transistors (i.e., BJT), and/or the like. In particular, and as illustrated in FIGS. 2-5, one or more embodiments of the present invention may use IGBTs as the first 108 and/or second 110 switching devices. Such IGBTs may include a collector region coupled to the first terminal of a corresponding switching device (e.g., 108 or 110), an emitter region coupled to the second terminal of a corresponding switching device and a gate region coupled to a control unit 112. Furthermore, in an embodiment wherein power flow is maintained in a single direction, one of the first 108 and second 110 switching devices may be eliminated.

In general, the first and second control signals may be any appropriate signal type (e.g., voltage signal, current signal, and/or the like) and may be generated by any appropriate number of appropriate control units 112 to meet the design criteria of a particular application.

The converter 100 may optionally include one or more diodes. For example, one or more embodiments may include a first diode 130 having a positive terminal (i.e., anode) coupled to the node 124 and a negative terminal (i.e., cathode) coupled to the node 122, and/or a second diode 132 having a positive terminal coupled to the node 126 and a negative terminal coupled to the node 124. The use of one or more diodes may be particularly beneficial in an embodiment wherein the first 108 and/or second 110 switching devices drive inductive loads.

In comparison to the conventional converters 10 and 20, a converter 100 according to an embodiment of the present invention may provide a higher output terminal voltage (e.g., V2) rating while using capacitors at lower voltage ratings, and/or reduce over-voltage occurrences due to susceptibility to capacitor parameter variation. In general, the voltage rating of the first capacitor 102 may need only correspond to the voltage V3 between the nodes 122 and 120. Similarly, the voltage rating of the second capacitor 104 may need only correspond to the voltage V1 between the nodes 120 and 126.

Figure 3:
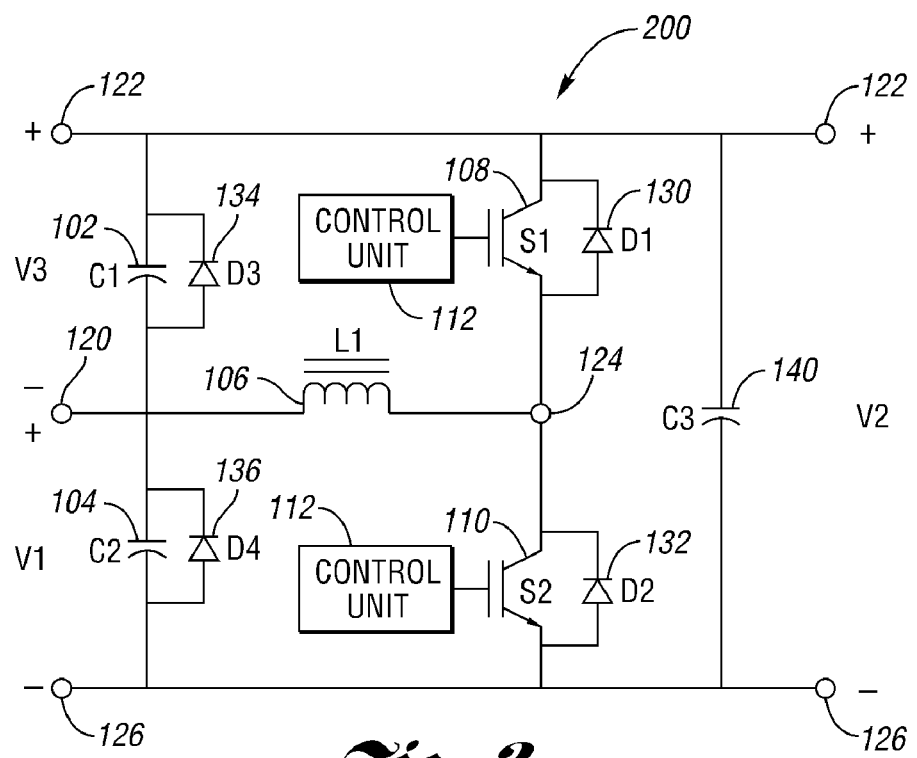
FIG. 3 is a schematic diagram of a DC-to-DC converter according to at least one other embodiment of the present invention.

Referring to FIG. 3, a schematic diagram of a DC-to-DC converter 200 according to at least one other embodiment of the present invention is shown. The converter 200 may be implemented similarly to the converter 100 with the exception that the converter 200 may further include a third diode 134, a fourth diode 136, a third capacitor 140, or any combination thereof.

The third diode 134 generally includes a positive terminal coupled to the node 120 and a negative terminal coupled to the node 122 such that the diode 134 resides across the first capacitor 102. The diode 134 may prevent reverse biasing of the first capacitor 102 during transients.

The fourth diode 136 generally includes a positive terminal coupled to the node 126 and a negative terminal coupled to the node 120 such that the diode 136 resides across the second capacitor 104. The diode 136 may prevent reverse biasing of the second capacitor 104 during transients.

The third capacitor 140 generally includes a first terminal coupled to the node 122 and a second terminal coupled to the node 126. Accordingly, the third capacitor 140 may reduce switching voltage spikes across nodes 122 and 126. In at least one embodiment, the capacitance (i.e., size) of the third capacitor 140 may be less than the capacitance of the first 102 and second 104 capacitor, individually (i.e., C3<C1 and C3<C2).

Referring, now, to FIG. 4, a schematic diagram of an electric motor drive system 400 according to at least one embodiment of the present invention is shown. The system 400 generally comprises an energy storage device 402, such as a battery, one or more drive units 404 (i.e., inverter, motor controller, etc.), one or more electric motors 406 in electronic communication with the one or more drive units 404, and/or a DC-to-DC converter 408. In the embodiment illustrated in FIG. 4, the converter 408 generally corresponds to the converter 200 discussed previously in connection with FIG. 3. However, the system 400 may be implemented in connection with any appropriate DC-to-DC converter 408, such as the converter 100 discussed previously in connection with FIG. 2, to meet the design criteria of a particular application.

The energy storage device 402 generally comprises a positive terminal coupled to node 120 and a negative terminal coupled to node 126 such that a voltage corresponding to the energy storage device (i.e., V1) may, in at least one embodiment, be placed across the nodes 120 and 126.

Furthermore, each of the one or more drive units 404 (e.g., 404a-404n) generally include a first terminal coupled to the node 122 and a second terminal coupled to the node 126.

In at least one embodiment, the system 400 may be configured, for example via a control circuit 112 generating one or more control signals, to step up an input voltage (e.g., V1) corresponding to the energy storage device 402 and output the stepped up voltage (e.g., V2) to the one or more drive units 404. Such an embodiment may be particularly useful in driving one or more electric motors 406 of a pure electric vehicle, a hybrid electric vehicle and/or a fuel-cell electric vehicle.

In at least one other embodiment, the system 400 may be configured, for example via a control circuit 112 generating one or more control signals, to step down an input voltage (e.g., V2) corresponding to regenerative voltage generated by the one or more electric motors 406 and output the stepped down voltage (e.g., V1) to the energy storage device 402. Such an embodiment may be particularly useful in charging a battery or other energy storage device 402 of a pure electric vehicle, a hybrid electric vehicle and/or a fuel-cell electric vehicle during a regenerative braking sequence.

Referring to FIG. 5, a schematic diagram of an electric motor drive system 500 according to at least one other embodiment of the present invention is shown. In general, the system 500 may be implemented similarly to the system 400 with the exception that the positive terminal of the energy storage device 402 may be coupled to node 122 and the negative terminal may be coupled to node 120 such that a voltage corresponding to the energy storage device (i.e., V3) may, in at least one embodiment, be placed across the nodes 122 and 120.

Accordingly, one or more embodiments of the present invention may provide a DC-to-DC converter and/or electric motor drive system, configurable for use with high DC voltages, of decreased cost of manufacturing.

While the best mode for carrying out the invention has been described in detail, those familiar with the art to which this invention relates will recognize various alternative designs and embodiments for practicing the invention as defined by the following claims.

What is claimed:

1. A DC-to-DC converter comprising:
  a first capacitor having a first and second terminal and being rated to a first voltage rating;
  a second capacitor having a first and second terminal;
  an inductor having a first and second terminal, wherein the first terminal of the inductor is coupled to both the first terminal of the second capacitor and the second terminal of the first capacitor to form a first node;
  a first switching device having a first and second terminal and configured to electrically couple the first and second terminals of the first switching device in response to a first control signal, wherein the first terminal of the first switching device is coupled to the first terminal of the first capacitor to form a second node; and
  a second switching device having a first and second terminal and configured to electrically couple the first and second terminals of the second switching device in response to a second control signal, wherein:
    the first terminal of the second switching device is coupled to the second terminal of the first switching device and the second terminal of the inductor to form a third node, the second terminal of the second switching device is coupled to the second terminal of the second capacitor to form a fourth node, the DC-to-DC converter is configured to facilitate bi-directional voltage transfer therethrough, and the first voltage rating of the first capacitor is substantially similar to a voltage between the first and second nodes.

2. The DC-to-DC converter of claim 1 wherein the first and second capacitors are polarized capacitors, the first terminal of each of the first and second capacitors corresponds to a positive lead, and the second terminal of each of the first and second capacitors corresponds to a negative lead.

3. The DC-to-DC converter of claim 1 wherein each of the first and second switching devices are Insulated Gate Bipolar Transistors having a collector region coupled to the first terminal, an emitter region coupled to the second terminal and a gate region coupled to a control unit and wherein a control unit generates and the gate region receives at least one of the first and second control signals.

4. The DC-to-DC converter of claim 1 further comprising:
a first diode having a positive terminal coupled to the third node and a negative terminal coupled to the second node; and
a second diode having a positive terminal coupled to the fourth node and a negative terminal coupled to the third node.

5. The DC-to-DC converter of claim 1 further comprising a diode having a positive terminal coupled to the first node and a negative terminal coupled to the second node.

6. The DC-to-DC converter of claim 1 further comprising a diode having a positive terminal coupled to the fourth node and a negative terminal coupled to the first node.

7. The DC-to-DC converter of claim 1 further comprising a third capacitor having a first terminal coupled to the second node and a second terminal coupled to the fourth node.

8. The system of claim 1 wherein the second capacitor is rated to a second voltage rating that is substantially similar to a voltage between the first and the fourth nodes.

9. An electric motor drive system comprising:
an energy storage device having a positive and a negative terminal;
a drive unit having a first and second terminal;
an electric motor in electronic communication with the drive unit; and
a bi-directional DC-to-DC converter comprising:
a first capacitor having a first and second terminal;
a second capacitor having a first and second terminal and being rated to a first voltage rating;
an inductor having a first and second terminal, wherein the first terminal of the inductor is coupled to both the first terminal of the second capacitor and the second terminal of the first capacitor to form a first node;
a first switching device having a first and second terminal and configured to electrically couple the first and second terminals of the first switching device in response to a first control signal, wherein the first terminal of the first switching device is coupled to the first terminal of the first capacitor to form a second node; and
a second switching device having a first and second terminal and configured to electrically couple the first and second terminals of the second switching device in response to a second control signal, wherein:

the first terminal of the second switching device is coupled to the second terminal of the first switching device and the second terminal of the inductor to form a third node, and the second terminal of the second switching device is coupled to the second terminal of the second capacitor to form a fourth node, and the first voltage rating of the second capacitor is substantially similar to a voltage between the first and fourth nodes, the positive terminal of the energy storage device is coupled to the first node and the negative terminal of the energy storage device is coupled to the fourth node, and the first and second terminals of the drive unit are coupled to the second and fourth nodes, respectively.

10. The system of claim 9 wherein the first capacitor is rated to a second voltage rating that is substantially similar to a voltage between the first and the second nodes.

11. The system of claim 9 further comprising a control circuit for generating the first and second control signals such that an input voltage corresponding to the energy storage device is stepped up and outputted to the drive unit.

12. The system of claim 9 further comprising a control circuit for generating the first and second control signals such that regenerative voltage generated by the electric motor is stepped down and outputted to the energy storage device.

13. The system of claim 9 further comprising a first terminal voltage configured for placement between the first and second nodes, wherein a first voltage rating of the first capacitor is equal to the first terminal voltage.

14. The system of claim 13 further comprising a second terminal voltage configured for placement between the first and fourth nodes, wherein a second voltage rating of the second capacitor is equal to the second terminal voltage.

15. The system of claim 9 wherein each of the first and second switching devices are Insulated Gate Bipolar Transistors having a collector region coupled to the first terminal, an emitter region coupled to the second terminal and a gate region coupled to a control unit, the control unit generating and the gate region receiving at least one of the first and second control signals.

16. The system of claim 9 further comprising:
a first diode having a positive terminal coupled to the third node and a negative terminal coupled to the second node; and
a second diode having a positive terminal coupled to the fourth node and a negative terminal coupled to the third node.

17. The system of claim 9 further comprising a diode having a positive terminal coupled to the first node and a negative terminal coupled to the second node.

18. The system of claim 9 further comprising a third capacitor having a first terminal coupled to the second node and a second terminal coupled to the fourth node.

19. An electric motor drive system comprising:
an energy storage device having a positive and a negative terminal;
a drive unit having a first and second terminal;
an electric motor in electronic communication with the drive unit; and
a bi-directional DC-to-DC converter comprising:
a first capacitor having a first and second terminal and being rated to a first voltage rating;
a second capacitor having a first and second terminal;
an inductor having a first and second terminal, wherein the first terminal of the inductor is coupled to both the first terminal of the second capacitor and the second terminal of the first capacitor to form a first node;

a first switching device having a first and second terminal and configured to electrically couple the first and second terminals of the first switching device in response to a first control signal, wherein the first terminal of the first switching device is coupled to the first terminal of the first capacitor to form a second node; and a second switching device having a first and second terminal and configured to electrically couple the first and second terminals of the second switching device in response to a second control signal, wherein:

the first terminal of the second switching device is coupled to the second terminal of the first switching device and the second terminal of the inductor to form a third node, the second terminal of the second switching device is coupled to the second terminal of the second capacitor to form a fourth node, and the first voltage rating of the first capacitor is substantially similar to the voltage between the first and second nodes, wherein the positive terminal of the energy storage device is coupled to the second node and the negative terminal of the energy storage device is coupled to the first node, and the first and second terminals of the drive unit are coupled to the second and fourth nodes, respectively.

20. The system of claim 19 further comprising a first terminal voltage configured for placement between the first and second nodes and a second terminal voltage configured for placement between the first and fourth nodes, wherein a first voltage rating of the first capacitor is equal to the first terminal voltage and a second voltage rating of the second capacitor is equal to the second terminal voltage.

21. The system of claim 19 wherein the second capacitor is rated to a second voltage rating that is substantially similar to a voltage between the first and the second nodes.

* * * * *